(No Model.)
T. CLEMENTS.
JOURNAL FOR CARRIAGE WHEELS.
No. 439,113. Patented Oct. 28, 1890.
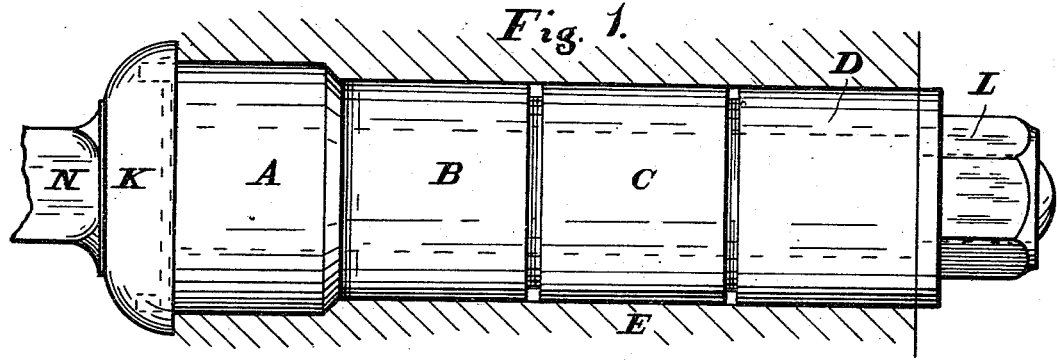
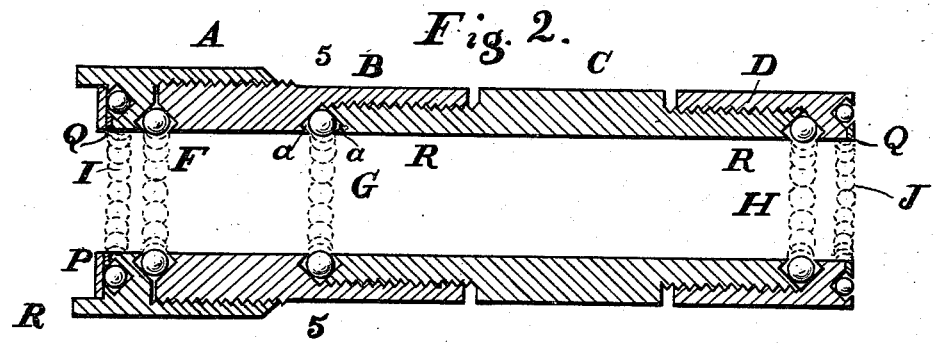
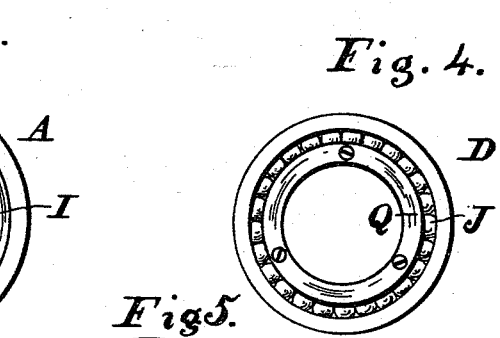
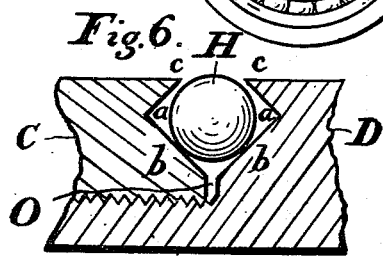
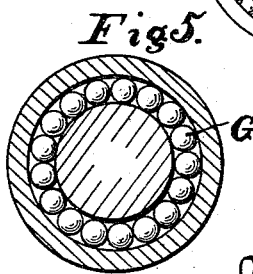
Witnesses:
R. F. Osgood.
C. Cranmell.
Inventor:
Thomas Clements,
By Geo. B. Selden,
Atty.

UNITED STATES PATENT OFFICE.

THOMAS CLEMENTS, OF ROCHESTER, NEW YORK, ASSIGNOR TO THE JAMES CUNNINGHAM SON & COMPANY, OF SAME PLACE.

JOURNAL FOR CARRIAGE-WHEELS.

SPECIFICATION forming part of Letters Patent No. 439,113, dated October 28, 1890.

Application filed March 18, 1890. Serial No. 344,434. (No model.)

*To all whom it may concern:*

Be it known that I, THOMAS CLEMENTS, a citizen of the United States, residing at Rochester, in the county of Monroe, in the State of New York, have invented certain Improvements in Carriage-Wheels, of which the following is a specification, reference being had to the accompanying drawings.

My invention relates to improved means of applying anti-friction balls to carriage-wheels, whereby the resistance of the wheel to turning on the axle is reduced and a cheap and durable construction provided.

My improvements are fully described and illustrated in the following specification and the accompanying drawings, and the novel features thereof specified in the claims annexed to the said specification.

My improvements in anti-friction bearings for carriage-wheels are represented in the accompanying drawings, in which—

Figure 1 is a side elevation of the sleeve and axle. Fig. 2 is a longitudinal section of the sleeve. Fig. 3 represents the inner end of the sleeve. Fig. 4 represents the outer end of the sleeve. Fig. 5 is a transverse section of the sleeve on the line 5 5, Fig. 2, showing one of the rings of anti-friction balls. Fig. 6 is a longitudinal section through one of the joints between the threaded sections of the sleeve, showing the manner of providing adjustment for wear.

In the construction of my improved anti-friction bearing for carriage-wheels I provide for a number of rings of anti-friction balls which bear on the axle by means of a sleeve formed in threaded sections and inserted in the hub. Thus the sleeve preferably consists of threaded sections A, B, C, and D, having the rings of balls F G H at their joints, the sleeve being pressed into the hub E of any ordinary or preferred kind. In addition to the rings of balls bearing directly on the axle, I provide the rings I and J, which bear, respectively, against the collar K on the axle and the nut L. Provision is made for taking up wear by screwing up the sections, the ends of which, where they come in contact with the rings of balls, being beveled or inclined, so that when brought nearer to each other by screwing them closer together the balls will be forced slightly inward toward the axle. The balls and wearing-surfaces are all hardened. An annular steel plate, also hardened, may be interposed at one end of the sleeve, as indicated at P, Fig. 2, for the purpose of adjusting for wear lengthwise of the axle by varying the thickness of the plate.

The opposing ends of the threaded sections are provided with annular V-shaped grooves $a\ a$, as represented in Fig. 6. These grooves are made of such a shape that the balls H bear on their outer inclined surfaces, as indicated at $b$, but they do not bear on their inner, as shown at $c\ c$, the threaded sections being capable of being screwed farther into each other to take up wear by closing up the space O and thus forcing the balls slightly inward, so as to come in contact with the axle N. The threads of the different sections are fitted closely, so that they will remain in any position in which they may be screwed together, and any tendency in the sections to turn relatively to each other when the wheel is in use, so as to allow the balls to separate from the axle, is effectively resisted by the friction between the sleeve and the hub, into which the sleeve is forced by a hydraulic press. When the sleeve is first fitted to the axle, the sections are adjusted relatively to each other, so that the balls project a short distance—say one thirty-second of an inch—beyond the inner surface of the sleeve, and after wear has taken place sufficient to require readjustment the sleeve is pressed out of the hub, the sections are screwed together, so as to force the balls farther inward, and the sleeve again inserted in the hub. It will be observed that even after excessive wear, so that the sleeve bears directly on the axle, the frictional conditions are still the same as with an ordinary wheel.

The rings of balls I and J at the ends of the sleeve, when used, are held in place by the annular plates Q, secured to the end sections by screws, or they may be threaded collars screwed into the end sections. The inner section is preferably provided with a flange R, projecting into a groove in the collar K on the axle for the purpose of excluding sand and dust.

It will be observed that one of the sections

C is provided with the threaded portions R R, extending in opposite directions, and that the next adjacent sections B and D are screwed onto the reduced portions of the intervening sections. The inner section A of the sleeve, however, is made larger than the others. This arrangement secures at the same time strength and cheapness of construction, although a larger number of threaded sections with rings at their joints may be employed. All the wearing-surfaces are ground true after being hardened.

My invention may be applied to any desired size of wheel, and on the lighter wheels the intermediate ring of balls G may be dispensed with.

An oil-cup nut surrounding the nut L and screwed onto the sleeve may be employed, if desired, to retain the lubricant in the journal and to prevent dust or dirt from obtaining access to the bearing.

I claim—

1. The combination, with the hub of a vehicle-wheel, of a sleeve inserted therein, consisting of a series of threaded sections having grooved ends and rings of balls located in the grooves between the ends of the sections, which are arranged to be screwed up to compensate for wear, substantially as described.

2. The combination, with the hub of a vehicle-wheel, of a sleeve inserted therein, consisting of a series of threaded sections having grooved ends and rings of balls located in the grooves between the ends of the sections, which are arranged to be screwed up to compensate for wear, and a ring of balls at one or both ends of the sleeve, secured in place by an annular plate or ring, substantially as described.

3. The combination, with the hub of a vehicle-wheel, of a removable sleeve inserted therein and consisting of a series of threaded sections having rings of anti-friction balls interposed at their joints, substantially as described.

4. The combination, with the hub of a vehicle-wheel, of a sleeve inserted therein, consisting of the threaded sections A, B, C, and D, having rings of anti-friction balls interposed at the joints between the sections, substantially as described.

THOMAS CLEMENTS.

Witnesses:
GEO. B. SELDEN,
C. G. CRANNELL.